(12) United States Patent  (10) Patent No.: US 9,128,705 B2
Thomson et al.  (45) Date of Patent: Sep. 8, 2015

(54) SYSTEM AND METHOD FOR CONTROLLING CENTRAL PROCESSING UNIT POWER WITH REDUCED FREQUENCY OSCILLATIONS

(75) Inventors: Steven S. Thomson, San Diego, CA (US); Bohuslav Rychlik, San Diego, CA (US); Ali Iranli, San Diego, CA (US); Brian J. Salsbery, Boulder, CO (US); Sumit Sur, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 12/944,378

(22) Filed: Nov. 11, 2010

(65) Prior Publication Data

US 2011/0145824 A1  Jun. 16, 2011

Related U.S. Application Data

(60) Provisional application No. 61/286,979, filed on Dec. 16, 2009.

(51) Int. Cl.
*G06F 1/32* (2006.01)

(52) U.S. Cl.
CPC .............. *G06F 1/3203* (2013.01); *G06F 1/324* (2013.01); *Y02B 60/1217* (2013.01)

(58) Field of Classification Search
USPC .................................. 713/320–324; 714/47.1
See application file for complete search history.

(56) References Cited

U.S. PATENT DOCUMENTS

| 4,601,008 | A | 7/1986 | Kato |
| 5,644,769 | A | 7/1997 | Hasiguti |
| 6,073,244 | A | 6/2000 | Iwazaki |
| 6,076,171 | A | 6/2000 | Kawata |
| 6,804,632 | B2 | 10/2004 | Orenstien et al. |
| 6,829,713 | B2 | 12/2004 | Cooper et al. |
| 6,978,389 | B2 | 12/2005 | Jahnke |
| 7,043,405 | B2 | 5/2006 | Orenstien et al. |
| 7,058,824 | B2 * | 6/2006 | Plante et al. .................. 713/300 |
| 7,107,187 | B1 | 9/2006 | Saghier et al. |
| 7,133,806 | B2 | 11/2006 | Prasad |
| 7,134,031 | B2 | 11/2006 | Flautner |
| 7,219,245 | B1 | 5/2007 | Raghuvanshi |
| 7,233,188 | B1 | 6/2007 | Takano et al. |

(Continued)

FOREIGN PATENT DOCUMENTS

| CN | 1678971 A | 10/2005 |
| CN | 1692326 A | 11/2005 |

(Continued)

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.
Semeraro et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.
International Search Report and Written Opinion—PCT/US2010/058075—ISA/EPO—Apr. 27, 2011.

(Continued)

*Primary Examiner* — Thuan Du
(74) *Attorney, Agent, or Firm* — Nicholas A. Cole

(57) ABSTRACT

A method of dynamically controlling power within a central processing unit is disclosed and may include entering an idle state, reviewing a previous busy cycle immediately prior to the idle state, and based on the previous busy cycle determining a CPU frequency for a next busy cycle.

28 Claims, 9 Drawing Sheets

(56) References Cited

U.S. PATENT DOCUMENTS

| | | | |
|---|---|---|---|
| 7,263,457 B2 | 8/2007 | White et al. | |
| 7,346,787 B2* | 3/2008 | Vaidya et al. | 713/300 |
| 7,369,967 B1 | 5/2008 | Washburn et al. | |
| 7,370,189 B2 | 5/2008 | Fischer et al. | |
| 7,398,407 B2 | 7/2008 | Jorgenson et al. | |
| 7,401,240 B2 | 7/2008 | Heller, Jr. et al. | |
| 7,437,581 B2 | 10/2008 | Grochowski et al. | |
| 7,467,291 B1 | 12/2008 | Cockroft et al. | |
| 7,500,124 B2 | 3/2009 | Seo | |
| 7,543,161 B2 | 6/2009 | Olszewski et al. | |
| 7,650,527 B2* | 1/2010 | Rambo et al. | 713/600 |
| 7,669,067 B2* | 2/2010 | Degenhardt | 713/322 |
| 7,689,838 B2 | 3/2010 | Srinivasan et al. | |
| 7,711,966 B2 | 5/2010 | Prabhakaran et al. | |
| 7,761,874 B2* | 7/2010 | Bodas | 718/100 |
| 7,783,906 B2* | 8/2010 | Turner et al. | 713/321 |
| 7,849,349 B2* | 12/2010 | Tamlyn | 713/501 |
| 7,949,887 B2 | 5/2011 | Gunther et al. | |
| 2002/0029353 A1 | 3/2002 | Hwang | |
| 2002/0046354 A1 | 4/2002 | Ostrom et al. | |
| 2002/0188877 A1 | 12/2002 | Buch | |
| 2002/0194509 A1* | 12/2002 | Plante et al. | 713/300 |
| 2003/0115495 A1 | 6/2003 | Rawson, III | |
| 2003/0177163 A1* | 9/2003 | Nomura | 709/102 |
| 2004/0225902 A1 | 11/2004 | Cesare et al. | |
| 2004/0254765 A1 | 12/2004 | Lee et al. | |
| 2005/0102560 A1 | 5/2005 | Taketoshi et al. | |
| 2006/0036878 A1 | 2/2006 | Rothman et al. | |
| 2006/0123253 A1 | 6/2006 | Morgan et al. | |
| 2006/0149975 A1 | 7/2006 | Rotem et al. | |
| 2007/0016815 A1 | 1/2007 | Cooper et al. | |
| 2007/0033425 A1 | 2/2007 | Clark | |
| 2007/0033526 A1 | 2/2007 | Thompson et al. | |
| 2007/0061108 A1 | 3/2007 | DeWitt et al. | |
| 2007/0255929 A1 | 11/2007 | Kasahara et al. | |
| 2008/0005591 A1 | 1/2008 | Trautman et al. | |
| 2008/0028244 A1 | 1/2008 | Capps et al. | |
| 2008/0162965 A1 | 7/2008 | Marinas et al. | |
| 2008/0168287 A1 | 7/2008 | Berry et al. | |
| 2008/0201591 A1 | 8/2008 | Hu et al. | |
| 2008/0310099 A1 | 12/2008 | Monferrer et al. | |
| 2009/0037922 A1 | 2/2009 | Herington | |
| 2009/0049314 A1 | 2/2009 | Taha et al. | |
| 2009/0106576 A1 | 4/2009 | Jacobowitz et al. | |
| 2009/0150695 A1 | 6/2009 | Song et al. | |
| 2009/0150696 A1 | 6/2009 | Song et al. | |
| 2009/0187775 A1 | 7/2009 | Ishikawa | |
| 2009/0217276 A1 | 8/2009 | Brenner et al. | |
| 2009/0230930 A1 | 9/2009 | Jain et al. | |
| 2009/0249347 A1 | 10/2009 | Henmi | |
| 2009/0271646 A1 | 10/2009 | Talwar et al. | |
| 2009/0276642 A1 | 11/2009 | Burton et al. | |
| 2010/0037038 A1 | 2/2010 | Bieswanger et al. | |
| 2010/0076733 A1 | 3/2010 | Kumar et al. | |
| 2010/0122101 A1 | 5/2010 | Naffziger et al. | |
| 2010/0169609 A1 | 7/2010 | Finkelstein et al. | |
| 2010/0299541 A1 | 11/2010 | Ishikawa et al. | |
| 2011/0023047 A1 | 1/2011 | Memik et al. | |
| 2011/0145559 A1 | 6/2011 | Thomson et al. | |
| 2011/0145605 A1 | 6/2011 | Sur et al. | |
| 2011/0145615 A1 | 6/2011 | Rychlik et al. | |
| 2011/0145616 A1 | 6/2011 | Rychlik et al. | |
| 2011/0145617 A1 | 6/2011 | Thomson et al. | |
| 2011/0145624 A1 | 6/2011 | Rychlik et al. | |
| 2013/0074085 A1 | 3/2013 | Thomson et al. | |
| 2013/0151879 A1 | 6/2013 | Thomson | |
| 2014/0181542 A1 | 6/2014 | Sur et al. | |

FOREIGN PATENT DOCUMENTS

| | | |
|---|---|---|
| CN | 101076770 A | 11/2007 |
| CN | 101111814 A | 1/2008 |
| CN | 101135928 A | 3/2008 |
| CN | 101211215 A | 7/2008 |
| CN | 101241390 A | 8/2008 |
| CN | 101351759 A | 1/2009 |
| CN | 101401056 A | 4/2009 |
| CN | 101403944 A | 4/2009 |
| CN | 101414268 A | 4/2009 |
| CN | 101436098 A | 5/2009 |
| EP | 0098169 A2 | 1/1984 |
| EP | 0942363 A2 | 9/1999 |
| EP | 1496424 A2 | 1/2005 |
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11282695 A | 10/1999 |
| JP | 2002099433 A | 4/2002 |
| JP | 2004533674 A | 11/2004 |
| JP | 2005128937 A | 5/2005 |
| JP | 2006011548 A | 1/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009037335 A | 2/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| TW | 200907660 A | 2/2009 |
| WO | WO0225414 A2 | 3/2002 |
| WO | WO-02074046 A2 | 9/2002 |
| WO | WO-2004044720 A2 | 5/2004 |
| WO | WO2005119412 A1 | 12/2005 |
| WO | 2006037119 A2 | 4/2006 |
| WO | 2007007300 A2 | 1/2007 |
| WO | WO-2007019003 A2 | 2/2007 |
| WO | 2008047179 A1 | 4/2008 |

OTHER PUBLICATIONS

International Search Report and Written Opinion—PCT/US2010/059535, ISA/EPO—Apr. 28, 2011.

International Search Report and Written Opinion—PCT/US2010/059560—ISA/EPO—Jun. 15, 2011.

International Search Report and Written Opinion—PCT/US2010/059562, ISA/EPO—May 27, 2011.

International Search Report and Written Opinion—PCT/US2010/059538, International Search Authority—European Patent Office—Apr. 7, 2011.

Compaq et al, "Advanced Configuration and Power Interface Specification", Compaq Computer Corporation, Intel Cor0poration, Microsoft Corporation, Phoenix Technologies Ltd., Toshiba Corporation, Revision 2.0, Jul. 27, 2000.

Stallings, W., "Operating systems internals and design principles," 2005, Pearson, 5th edition, section 3.2, pp. 111-126.

Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86. 1:811.

iDebian, CPU frequency scaling in Linux, Jun. 26, 2008, iDebian's Weblog.

Kondo M., et al., "Dynamic Processor Throttling for Low Power Computing", IPSJ Transactions on Advanced Computing Systems, Information Processing Society of Japan, May 15, 2004, vol. 45 No. SIG6 (ACS6), pp. 1-11.

Sasaki H., et al., "Dynamic Optimization for CMP by Efficient Regression Modeling", IPSJ SIG Technical Reports, Japan, Information Processing Society of Japan, Jul. 29, 2008, vol. 2008, No. 75, pp. 31-36.

* cited by examiner

SYSTEM AND METHOD FOR CONTROLLING CENTRAL PROCESSING UNIT POWER WITH REDUCED FREQUENCY OSCILLATIONS

RELATED APPLICATIONS

The present application claims priority to U.S. Provisional Patent Application Ser. No. 61/286,979, entitled SYSTEM AND METHOD OF DYNAMICALLY CONTROLLING POWER IN CENTRAL PROCESSING UNIT, filed on Dec. 16, 2009, the contents of which are fully incorporated by reference.

CROSS-REFERENCED APPLICATIONS

The present application is related to, and incorporates by reference, U.S. patent application Ser. No. 12/944,140, entitled SYSTEM AND METHOD FOR CONTROLLING CENTRAL PROCESSING UNIT POWER BASED ON INFERRED WORKLOAD PARALLELISM, by Rychlik et al., filed concurrently. The present application is related to, and incorporates by reference, U.S. patent application Ser. No. 12/944,202, entitled SYSTEM AND METHOD FOR CONTROLLING CENTRAL PROCESSING UNIT POWER IN A VIRTUALIZED SYSTEM, by Rychlik et al., filed concurrently. The present application is related to, and incorporates by reference, U.S. patent application Ser. No. 12/944,321, entitled SYSTEM AND METHOD FOR ASYNCHRONOUSLY AND INDEPENDENTLY CONTROLLING CORE CLOCKS IN A MULTICORE CENTRAL PROCESSING UNIT, by Rychlik et al., filed concurrently. The present application is related to, and incorporates by reference, U.S. patent application Ser. No. 12/944,467, entitled SYSTEM AND METHOD FOR CONTROLLING CENTRAL PROCESSING UNIT POWER WITH GUARANTEED TRANSIENT DEADLINES, by Thomson et al., filed concurrently. The present application is related to, and incorporates by reference, U.S. patent application Ser. No. 12/944,561, entitled SYSTEM AND METHOD FOR CONTROLLING CENTRAL PROCESSING UNIT POWER WITH GUARANTEED STEADY STATE DEADLINES, by Thomson et al., filed concurrently. The present application is related to, and incorporates by reference, U.S. patent application Ser. No. 12/944,564, entitled SYSTEM AND METHOD FOR DYNAMICALLY CONTROLLING A PLURALITY OF CORES IN A MULTICORE CENTRAL PROCESSING UNIT BASED ON TEMPERATURE, by Sur et al., filed concurrently.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power within a CPU.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
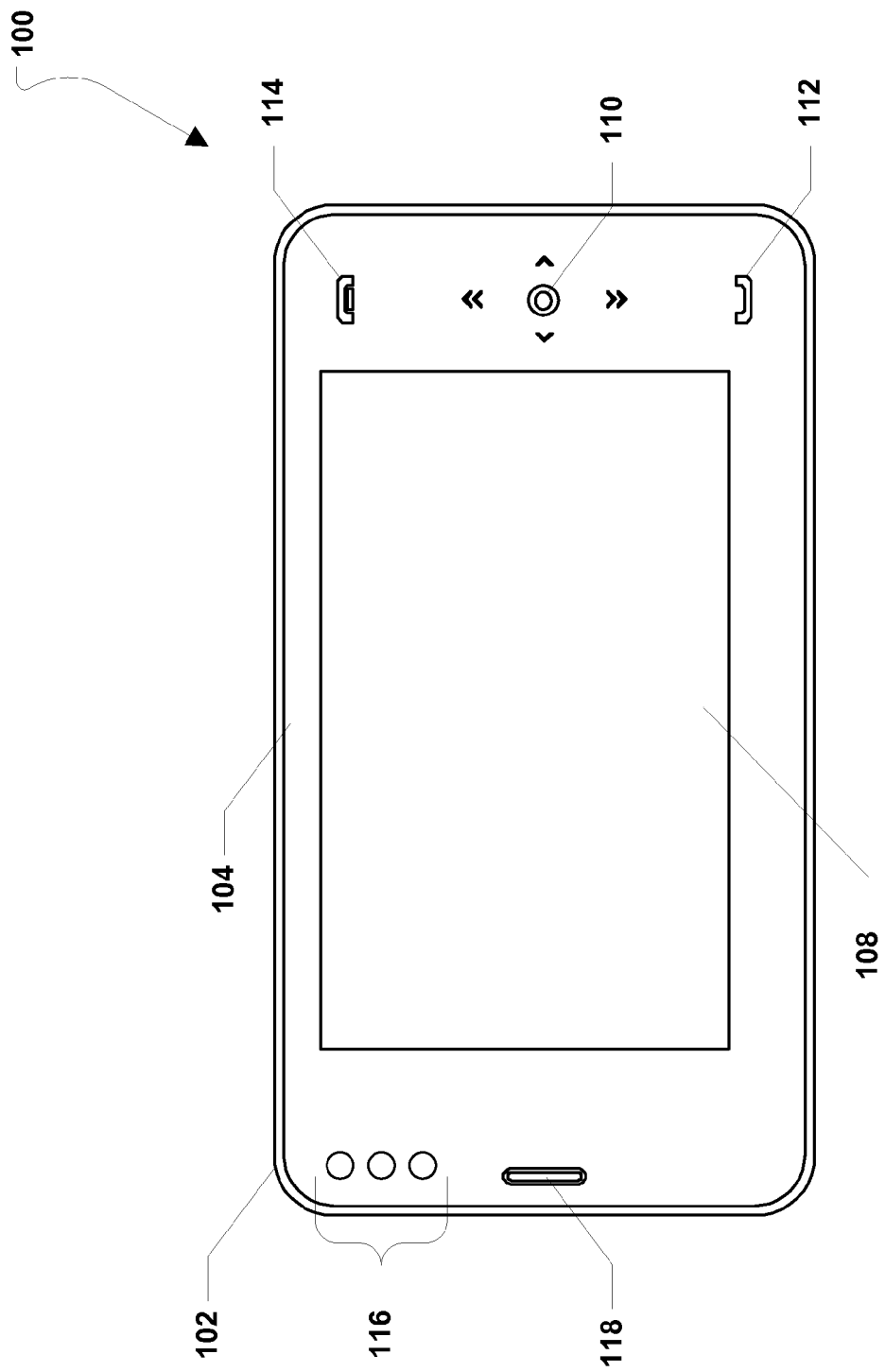
FIG. 1 is a front plan view of a first aspect of a portable computing device (PCD) in a closed position.
Figure 2:
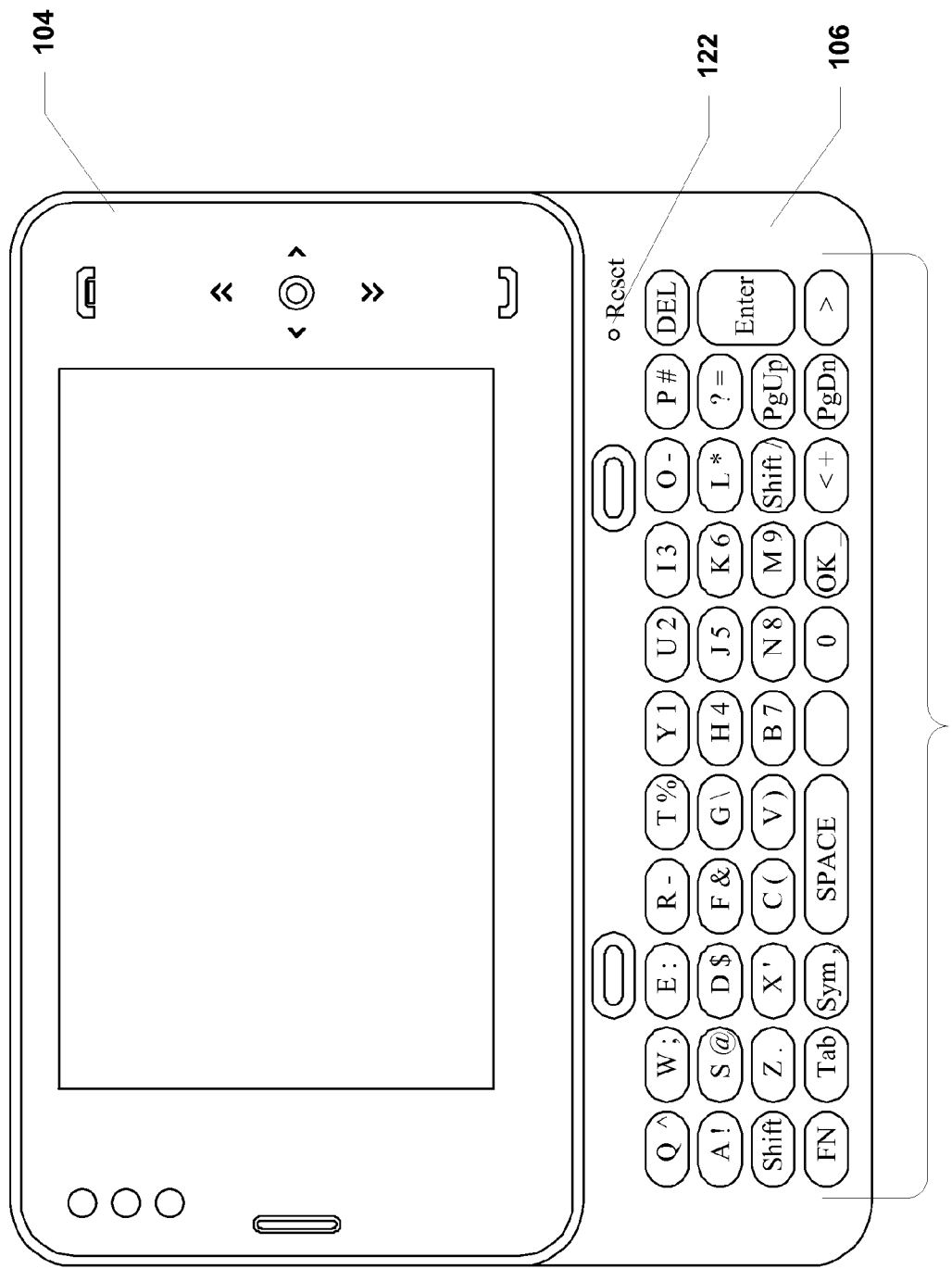
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
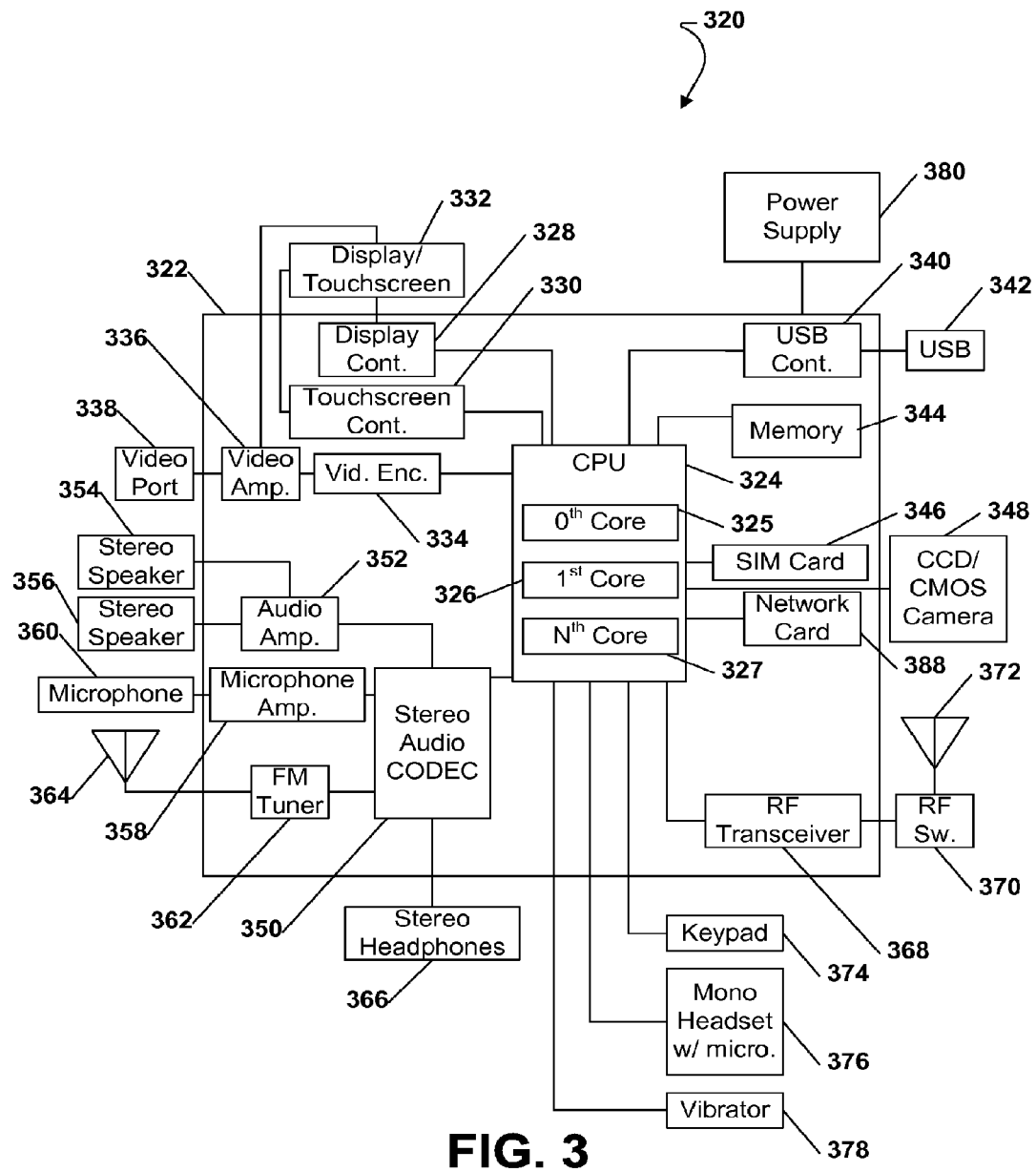
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

Figure 4:
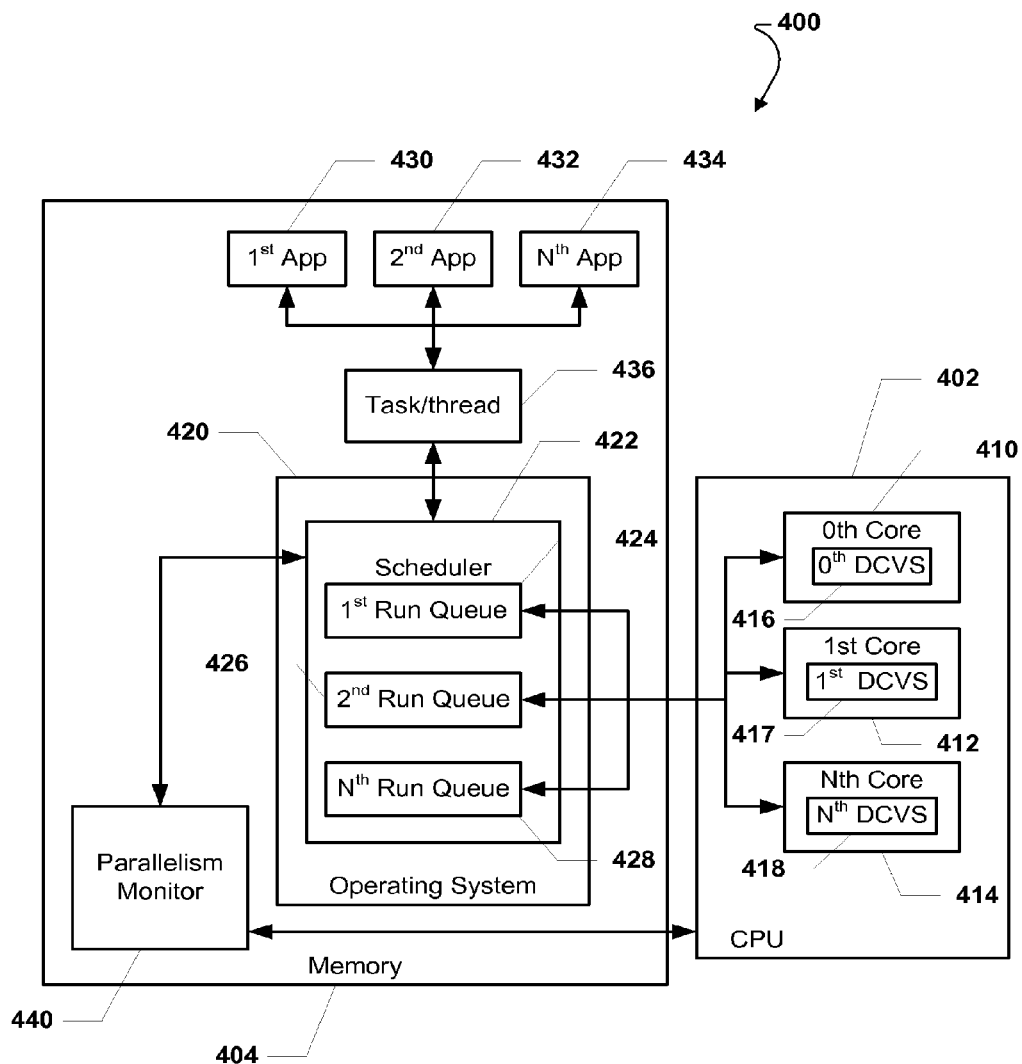
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a parallelism monitor 440 stored thereon. The parallelism monitor 440 may be connected to the operating system 420 and the multicore CPU 402. Specifically, the parallelism monitor 440 may be connected to the scheduler 422 within the operating system 420.

Figure 5:
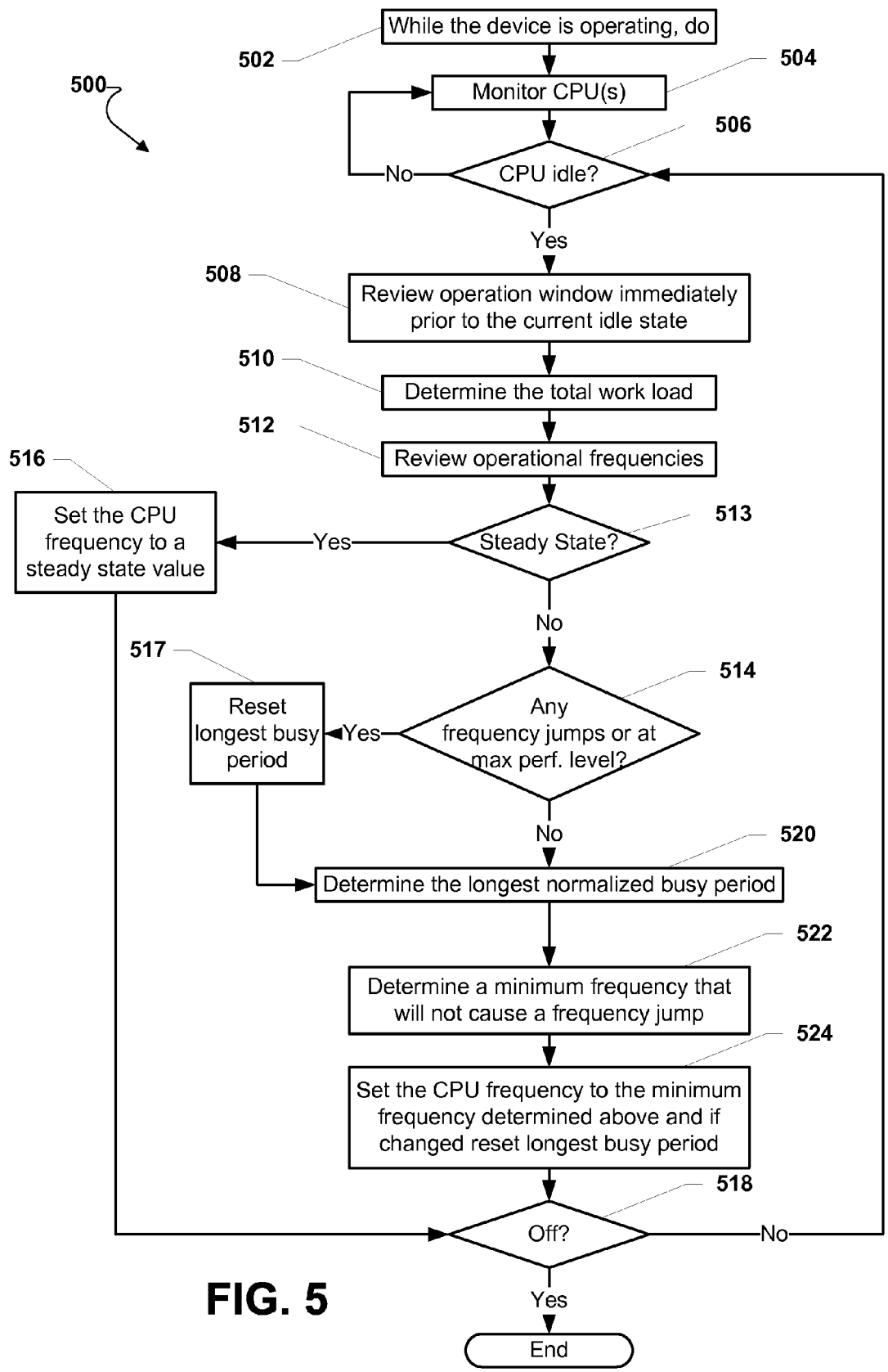
FIG. 5 is a flowchart illustrating a first aspect of a method of dynamically controlling power within a CPU.

Referring to FIG. 5, a first aspect of a method of dynamically controlling the power of a central processing unit is shown and is generally designated 500. The method 500 may commence at block 502 with a do loop in which when device is powered on, the following steps may be performed.

At block 504, a power controller, e.g., a dynamic clock and voltage scaling (DCVS) algorithm, may monitor one or more CPUs. At decision 506, the power controller may determine whether the CPU is idle. If not, the method 500 may return to block 504 and continue as described herein. Otherwise, if the CPU is idle, the method 500 may proceed to block 508 and the power controller may review a busy cycle, i.e., operation window, immediately prior to the current idle state. At block 510, the power controller may determine the total work load during the previous busy cycle. Further, at block 512, the power controller may review the operational frequencies utilized during the previous busy cycle.

Moving to decision 513, the power controller may determine whether the previous busy cycle ended at the steady state level. If so, the method 500 may proceed to block 516 and the power controller may set the CPU frequency to a steady state value. Then, the method 500 may proceed to decision 518. At decision 518, the power controller may determine whether the device is powered off. If the device is powered off, the method may end. Otherwise, if the device remains powered on, the method 500 may return to block 504 and the method 500 may continue as described.

Returning to decision 513, if the previous busy cycle did not end at a the steady state, the method 500 may move to decision 514 and the power controller may determine whether the previous busy cycle included any frequency jumps or is at the maximum performance level, e.g., due to workload increases. If so, the method 500 may proceed to block 517 and the power controller may reset the longest normalized busy period. The method 500 may continue block 520 and continue as described herein.

Returning to decision 514, if the previous busy cycle did not include any frequency jumps and is not at the maximum performance level, the method 500 may proceed to block 520 and the power controller may determine the longest normalized busy period since being reset. At block 522, the power controller may determine a minimum operational frequency that would not have caused a frequency jump had it been used starting at the time the longest busy period was last reset. Next, the power controller sets the CPU frequency to the minimum frequency determined above and resets the longest busy period if the minimum frequency is not the same as the previous CPU frequency. The method 500 may then proceed to decision 518. At decision 518, the power controller may determine whether the device is powered off. If the device is powered off, the method may end. Otherwise, if the device remains powered on, the method 500 may return to block 504 and the method 500 may continue as described.

In a particular aspect, the method 500 may include a steady state and a transient state. Decision 513 may be used to control the transition between the steady state and the transient state. Having the ability to transition between the steady state and the transient state may reduce excessive oscillation in the frequency. Further, the method 500 may be considered self-tuning and may provide dynamic window sizes.

Figure 6:
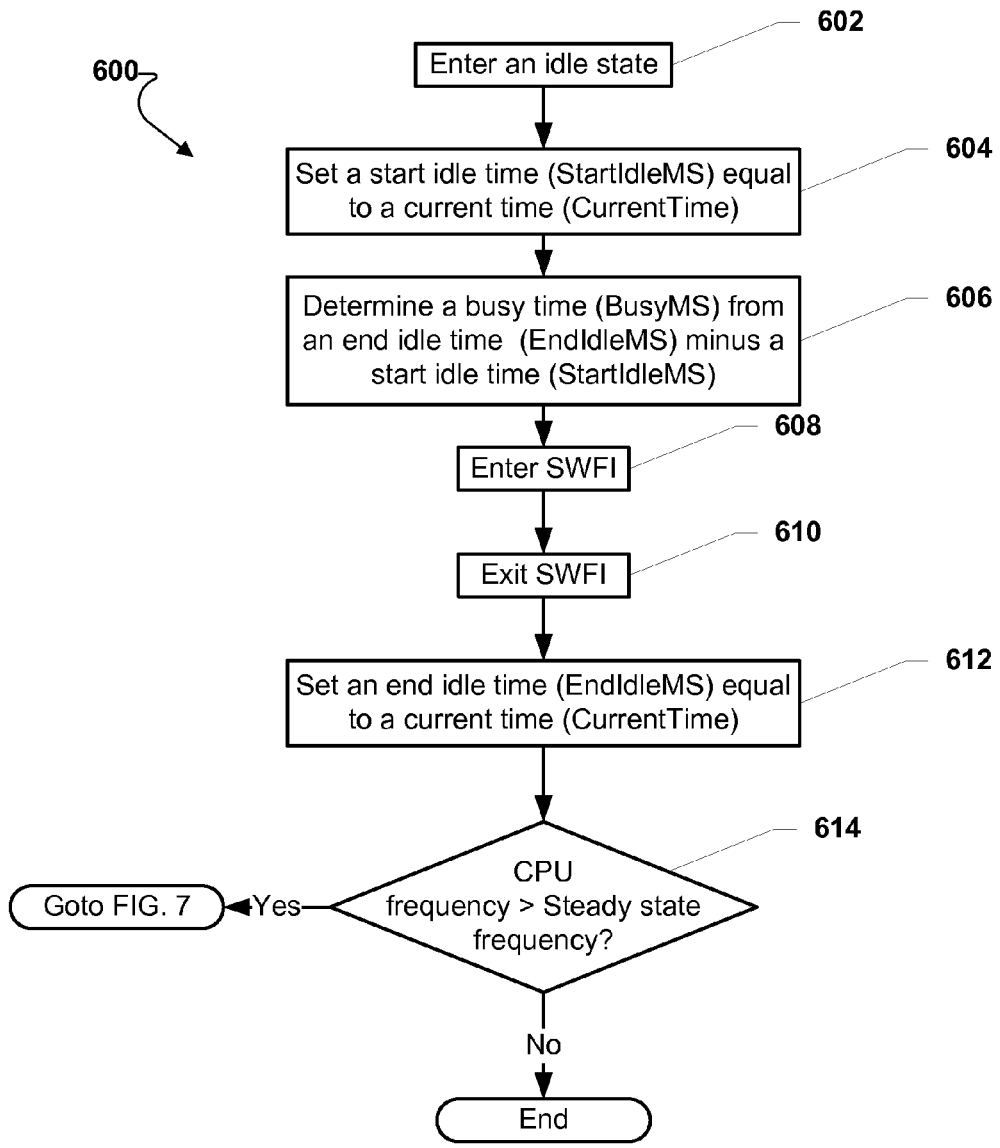
FIG. 6 is a flowchart illustrating a first portion of a second aspect of a method of dynamically controlling power within a CPU.

Referring to FIG. 6, a second aspect of a method of dynamically controlling the power of a central processing unit is shown and is generally designated 600. Beginning at block 602, a central processing unit (CPU) may enter an idle state. At block 604, a power controller, e.g., a dynamic clock and voltage scaling (DCVS) algorithm, may set a start idle time (StartIdleTime) equal to a current time (CurrentTime). Further, at block 606, the power controller may determine a busy time (BusyTime) by subtracting a start idle time (StartIdleTime) from an end idle time (EndIdleTime).

At block 608, the CPU may enter a software wait for interrupt (SWFI) condition. At block 610, the CPU may exit the SWFI condition. Moving to block 612, the power controller may set an end idle time (EndIdleTime) equal to a current time (CurrentTime). At decision 614, the power controller may determine whether the highest CPU frequency of the previous busy cycle is greater than a steady state frequency. If not, the method 600 may end. Otherwise, the method 600 may proceed to decision 702 of FIG. 7.

Figure 7:
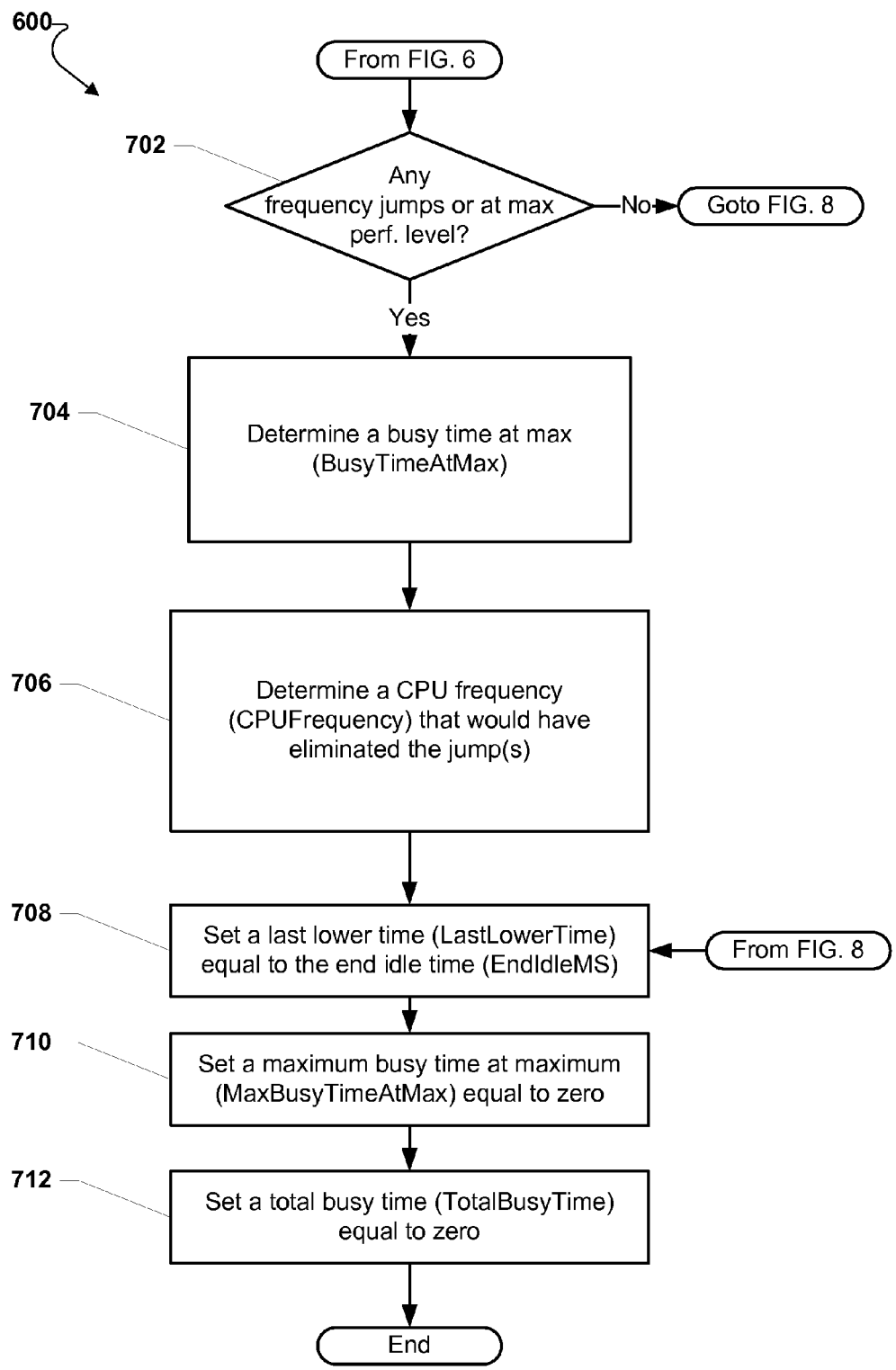
FIG. 7 is a flowchart illustrating a second portion of the second aspect of a method of dynamically controlling power within a CPU.

At decision 702 of FIG. 7, the power controller may determine if the previous busy cycle included any frequency jumps or is at the maximum performance level. If so, the method may proceed to block 704 and the power controller may determine a busy time at the maximum CPU frequency (BusyTimeAtMax), i.e., how long the CPU would have been busy if it had been running at the maximum frequency during the complete busy period. The BusyTimeAtMax is a normalized value. In other words, the BusyTimeAtMax is normalized to a single performance level, e.g., the maximum frequency.

The BusyTimeAtMax may be determined using the following formula:

$$BusyTimeAtMax = \sum_{N=MinCPUFreq}^{MaxCPUFreq} (BusyTimeAtFreq[N] * (N/MaxCPUFreq))$$

where,

BusyTimeAtFreq[N]=The total amount of time that the CPU was busy during the previous busy cycle at frequency N, MaxCPUFreq=The maximum CPU frequency; and MinCPUFreq=The minimum CPU frequency.

For example, if the previous busy cycle was two milliseconds (2 ms) and the CPU spent one millisecond (1 ms) at the a maximum frequency of one GigaHertz (1 GHz) and one millisecond at a nominal frequency of one hundred Megahertz (100 MHz), the BusyTimeAtMax would be equal to 1.1 ms.

Moving to block 706, the power controller may determine a CPU frequency (CPUFreq) that would not have caused any frequency jumps. Specifically, the power controller may determine the lowest CPU frequency that would have eliminated any frequency jumps. This is determined by calculating the slack budget for each CPU frequency that would be calculated by the transient filter and determining if the slack budget is sufficient that it would not cause the transient filter to make frequency jump.

This determination may be made by setting the CPUFreq equal to the minimum CPU frequency (MinCPUFreq) and then performing a do loop until a condition is met. Each time the condition is not met the CPUFreq may be increased by one value (CPUFreq=CPUFreq+1) until a maximum CPU frequency (MaxCPUFreq) is met. The condition is as follows:

$$(((MaxCPUFreq * slackBudget)/(MaxCPUFreq - CPUFreq)) * SteadyStateAdjustment) <= (BusyTimeAtMax * (MaxCPUFreq/CPUFreq))$$

where,

MaxCPUFreq=The maximum CPU frequency;

slackBudget=The transient response filter deadline to jump to a higher CPU frequency for the current CPUFreq being tested;

CPUFreq=The current CPU frequency being tested to eliminate the jump;

SteadyStateAdjustment=Any adjustment required due to the steady state filter design; and BusyTimeAtMax=The normalized value of how long the CPU was operating at the maximum CPU frequency (determined above).

Once the condition is met, the CPU frequency may be set to the CPUFreq above that meets the condition. Moving to block 708 through 712, the power controller may initialize the state of the energy minimization algorithm described herein. Specifically, at block 708, the power controller may set a last lower time (LastLowerTime) equal to the end idle time (EndIdleTime). At block 710, the power controller may set a maximum busy time at maximum (MaxBusyTimeAtMax) equal to zero. Next, at block 712, the power controller may set a total busy time (TotalBusyTime) equal to zero. Thereafter, the method 600 may end.

Figure 8:
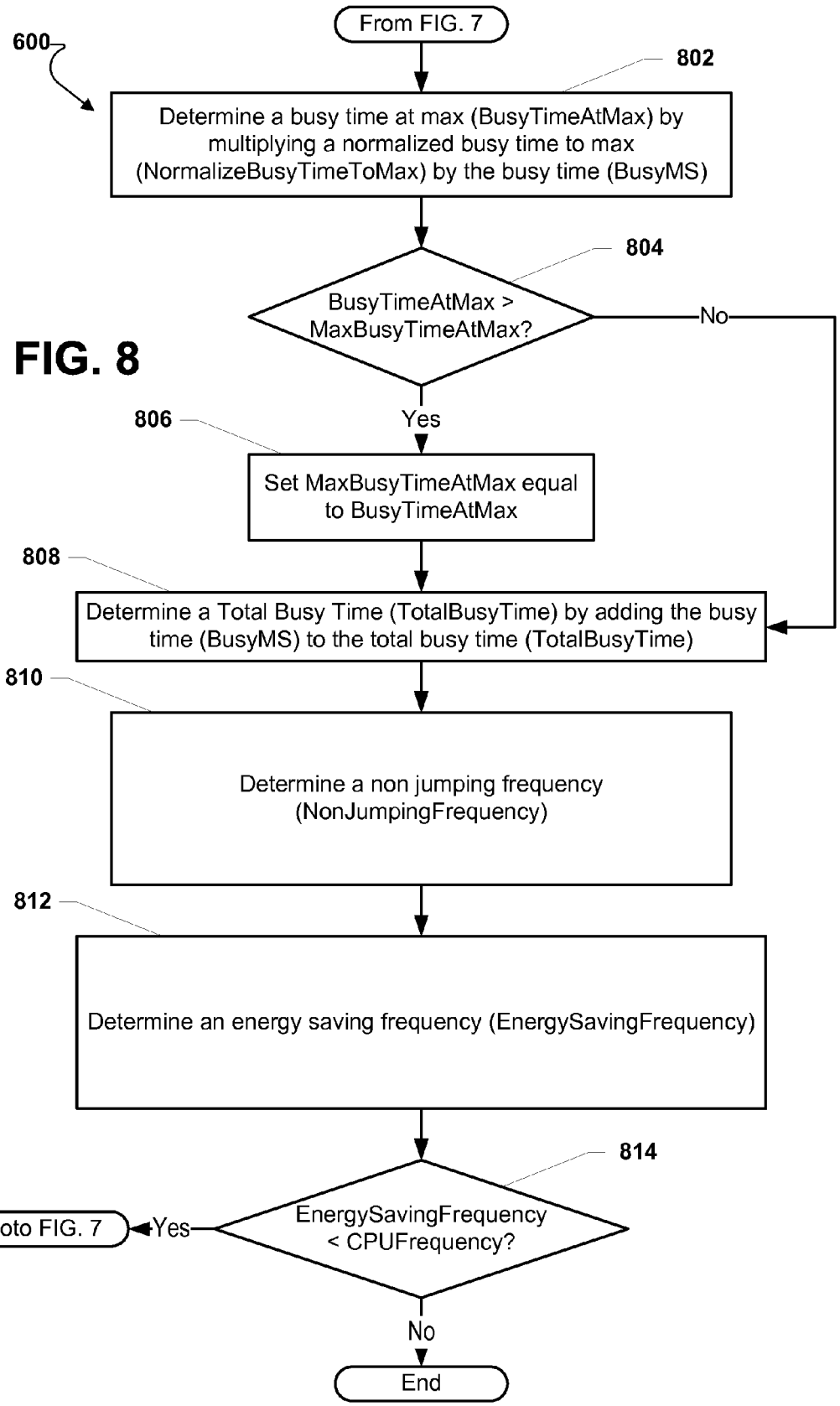
FIG. 8 is a flowchart illustrating a third portion of the second aspect of a method of dynamically controlling power within a CPU.

Returning to decision 702, if the previous busy cycle did not include any frequency jumps and is not at the maximum performance level, the method may proceed to block 802 of FIG. 8 and the method 600 may continue as described herein.

At block 802, the power controller may determine a busy time at max (BusyTimeAtMax) using the same formula described above. Thereafter, at decision 804, the power controller may determine whether the BusyTimeAtMax is greater than a maximum busy time at the maximum CPU (MaxBusyTimeAtMax). If the BusyTimeAtMax is greater than the MaxBusyTimeAtMax, the method 600 may proceed to block 806 and the power controller may set the MaxBusyTimeAtMax equal to the BusyTimeAtMax. Then, the method 800 may move to block 808. At decision 804, if the BusyTimeAtMax is not greater than the MaxBusyTimeAtMax, the method 800 may move directly to block 808.

At block 808, the power controller may determine a running total busy time (TotalBusyTime) by adding the busy time (BusyTime) to the total busy time (TotalBusyTime). At block 810, the power controller may determine a non jumping frequency (NonJumpingFrequency) using the same do loop described above in conjunction with block 706. Moving to block 812, the power controller may determine an energy saving frequency (EnergySavingFrequency). In a particular aspect, the EnergySavingFrequency is the lowest frequency (starting from the level calculated in block 810) that the CPU should be set too in order to save on energy consumption. In this aspect, the assumption may be made that the system will not need to jump for at least as long as the amount of time since the last lowering of frequency. Also, the assumption may be made that immediately after the same time period a jump will occur. This step also includes the clock switching overhead and the scheduling overhead.

In a particular aspect, the amount of energy consumed at the current CPU frequency is determined. That value may be denoted DCVSFloorEnergy. Then, the CPU frequency may be raised until a value is found that has at most a one percent (1%) clock switch overhead, or that uses less energy than the current performance level. In a particular aspect, the one percent (1%) value is arbitrary and may be eliminated.

While the CPU frequency is less than the current CPU frequency and the elapsed time (elapsedTime) is less than clockSwitchOverhead times 2 times one hundred, the system may determine how long to run at the CPU frequency in order to see the exact same workload as the previous busy cycle. That value may be denoted as the DCVSJFloorBusyTime and may be determined using the following formula:

$$DCVSJFloorBusyTime=(totalBusyTime*CPUFreq/currentCPUFreq)+(clockSwitchOverhead*2)$$

Also, the system may determine the amount of energy that the CPU would consume at the CPUFreq with the same workload as the previous busy cycle. Moving to decision 814, the power controller may determine whether the EnergySavingFrequency is less than the current CPUFrequency. If so, the method 600 may return to block 708 of FIG. 7 and the method 600 may continue as described herein. Otherwise, the method 600 may end.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

In a particular aspect, a DCVS algorithm is a mechanism which measures CPU load/idle time and dynamically adjusts the CPU clock frequency to track the workload in an effort to reduce power consumption while still providing satisfactory system performance. As the workload changes, the change in CPU throughput may track, but also necessarily lag, the changes in the workload. Unfortunately, this may introduce a problem in cases where the workload has Quality of Service (QoS) requirements, as the DCVS algorithm may not track the workload quickly enough. Further, tasks may fail. The performance (QoS) issues may be solved with the introduction of transient performance deadlines, i.e., explicit panics to a higher performance level, however this may result in an actual increase in power due frequency oscillations induced when transitioning between steady state and transient CPU frequencies.

Figure 9:
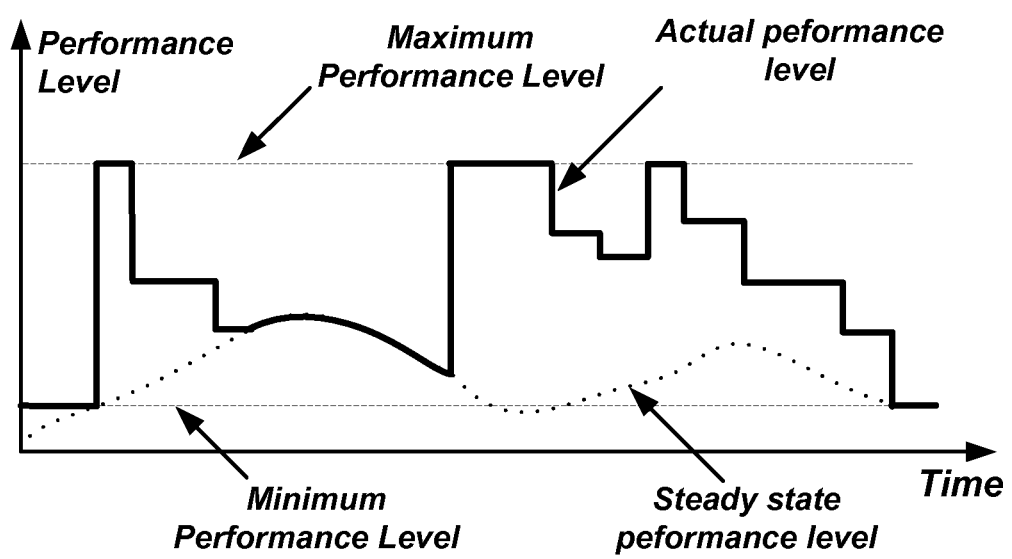
FIG. 9 is an exemplary graph showing the dynamic clock and voltage scaling (DCVS) controlled CPU frequency plotted over time.

The system and methods described herein may be used to manage the transition between transient and steady state performance levels. Further, the system and methods described herein may substantially reduce any oscillation. As a result, there may be substantial savings in net power consumed. As shown in FIG. 9, the systems and methods described herein provide dynamic CPU power control without excessive oscillation.

In order to avoid the problem of excessive frequency oscillations due to QoS deadlines and/or explicit panics, the present methods introduce an energy minimization algorithm which may control the transitions between the steady state and transient state, i.e., explicit panics to a higher performance levels. The energy minimization methods, or algorithms, described herein may effectively managing the jumps between the maximum performance level caused by the transient response guarantee, i.e., the explicit jumps to higher performance levels, and the lower steady state performance level.

In the absence of any jumps between the two levels, the energy minimization algorithm can just set the CPU performance level to the steady state value. As such, the methods described herein may determine how to lower the performance level down to the steady state level in the most energy efficient manner. Further, these methods may actively manage the performance level from the moment in time that a transient pulse, i.e., an explicit panic to a higher frequency, completes, until the performance level is taken back down to the level indicated by the steady state level. In general, the performance level may be taken down in discrete steps that will eliminate the possibility of needing a jump to a higher performance level if the exact same idle/busy profile was repeated, that was just seen since the last drop in frequency (performance level). For example, if a transient pulse causes a jump to the maximum clock frequency, then on the next idle period, the energy minimization methods, described herein, may set the performance level to that which would have eliminated the jump. On each succeeding idle period a controller may determine the lowest frequency at or above the steady state performance level that would have saved energy, assuming that the exact same idle/busy profile is repeated from the point in time that the last frequency reduction was made.

In a particular aspect, the methods described herein may utilize other approaches to reduce the frequency from the higher performance level down to the steady state level. For example, steps may be time, steps may be linear, steps may be non-linear, a low pass filter based on jumps per second may be used, or any combination thereof may be used.

Further, the system and method described herein may ensure that excessive frequency changes may not be made, despite the presence of QoS deadlines, or explicit panics to higher performance levels. Accordingly, power consumption may be substantially lowered.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of dynamically controlling power within a central processing unit (CPU), the method comprising:
   entering an idle state;
   reviewing, during the idle state, changes in operational frequencies of the CPU in response to transient workloads occurring during a previous busy cycle immediately prior to the idle state to determine whether the previous busy cycle included a CPU frequency jump to a higher CPU frequency above a steady state frequency of the CPU;
   determining a minimum operational frequency above the steady state frequency sufficient to prevent the CPU frequency jump in the presence of the transient workloads when it is determined that the previous busy cycle included a CPU frequency jump;
   setting a CPU frequency for a next busy cycle equal to the determined minimum operational frequency; and
   entering a run state and processing a new steady state workload at the set CPU frequency.

2. The method of claim 1, further comprising:
   determining a total work load of the previous busy cycle.

3. The method of claim 2, wherein reviewing changes in operational frequencies of the CPU in response to transient workloads occurring during a previous busy cycle immediately prior to the idle state further comprises:
   determining whether the previous busy cycle ended at a steady state level.

4. The method of claim 3, further comprising:
   setting the CPU frequency for the next busy cycle to the steady state frequency in response to determining that the previous busy cycle ended at the steady state level.

5. The method of claim 3, further comprising:
   determining whether the previous busy cycle ended at a maximum performance level in response to determining that the previous busy cycle did not end at the steady state level.

6. The method of claim 5, further comprising:
   resetting a longest busy period in response to determining that the previous busy cycle ended at the steady state level.

7. The method of claim 6, further comprising:
   determining a longest normalized busy period since the last reset.

8. A computing device, comprising:
   a central processing unit (CPU);
   means for entering an idle state;
   means for reviewing, during the idle state, changes in operational frequencies of the CPU in response to transient workloads occurring during a previous busy cycle immediately prior to the idle state to determine whether the previous busy cycle included a CPU frequency jump to a higher CPU frequency above a steady state frequency of the CPU;
   means for determining a minimum operational frequency above the steady state frequency sufficient to prevent the CPU frequency jump in the presence of the transient workloads when it is determined that the previous busy cycle included a CPU frequency jump;
   means for setting a CPU frequency for a next busy cycle equal to the determined minimum operational frequency; and
   means for entering a run state and processing a new steady state workload at the set CPU frequency.

9. The device of claim 8, further comprising:
   means for determining a total work load of the previous busy cycle.

10. The device of claim 9, wherein means for reviewing changes in operational frequencies of the CPU in response to transient workloads occurring during a previous busy cycle immediately prior to the idle state comprises:
   means for determining whether the previous busy cycle ended at a steady state level.

11. The device of claim 10, further comprising:
   means for setting the CPU frequency for the next busy cycle to the steady state frequency in response to determining that the previous busy cycle ended at the steady state level.

12. The device of claim 10, further comprising:
   means for determining whether the previous busy cycle ended at a maximum performance level in response to determining that the previous busy cycle did not end at the steady state level.

13. The device of claim 12, further comprising:
   means for resetting a longest busy period in response to determining that the previous busy cycle ended at the steady state level.

14. The device of claim 13, further comprising:
   means for determining a longest normalized busy period since the last reset.

15. A computing device, comprising:
   a processor, wherein the processor is configured with processor-executable instructions to perform operations comprising:
   entering an idle state;
   reviewing, during the idle state, changes in operational frequencies of the processor in response to transient workloads occurring during a previous busy cycle immediately prior to the idle state to determine whether the previous busy cycle included a processor frequency jump to a higher processor frequency above a steady state frequency of the processor;

determining a minimum operational frequency above the steady state frequency sufficient to prevent the processor frequency jump in the presence of the transient workloads when it is determined that the previous busy cycle included a processor frequency jump;

setting a processor frequency for a next busy cycle equal to the determined minimum operational frequency; and entering a run state and processing a new steady state workload at the set processor frequency.

16. The computing device of claim 15, wherein the processor is configured with processor-executable instructions to perform operations further comprising:

determining a total work load of the previous busy cycle.

17. The computing device of claim 16, wherein the processor is configured with processor-executable instructions to perform operations such that reviewing changes in operational frequencies of the processor in response to transient workloads occurring during a previous busy cycle immediately prior to the idle state comprises determining whether the previous busy cycle ended at a steady state level.

18. The computing device of claim 17, wherein the processor is configured with processor-executable instructions to perform operations further comprising:

setting the processor frequency for the next busy cycle to the steady state frequency in response to determining that the previous busy cycle ended at the steady state level.

19. The computing device of claim 17, wherein the processor is configured with processor-executable instructions to perform operations further comprising:

determining whether the previous busy cycle ended at a maximum performance level in response to determining that the previous busy cycle did not end at the steady state level.

20. The computing device of claim 19, wherein the processor is configured with processor-executable instructions to perform operations further comprising:

resetting a longest busy period in response to determining that the previous busy cycle ended at the steady state level.

21. The computing device of claim 20, wherein the processor is configured with processor-executable instructions to perform operations further comprising:

determining a longest normalized busy period since the last reset.

22. A non-transitory computer-readable storage medium having stored thereon computer-executable instructions configured to cause a processor to perform operations comprising:

entering an idle state;

reviewing, during the idle state, changes in operational frequencies of the processor in response to transient workloads occurring during a previous busy cycle immediately prior to the idle state to determine whether the previous busy cycle included a processor frequency jump to a higher processor frequency above a steady state frequency of the processor;

determining a minimum operational frequency above the steady state frequency sufficient to prevent the processor frequency jump in the presence of the transient workloads when it is determined that the previous busy cycle included a processor frequency jump;

setting a processor frequency for a next busy cycle equal to the determined minimum operational frequency; and entering a run state and processing a new steady state workload at the set processor frequency.

23. The non-transitory computer-readable storage medium of claim 22, wherein the stored processor-executable software instructions are configured to cause a processor to perform operations further comprising:

determining a total work load of the previous busy cycle.

24. The non-transitory computer-readable storage medium of claim 23, wherein the stored processor-executable software instructions are configured to cause a processor to perform operations such that reviewing changes in operational frequencies of the CPU in response to transient workloads occurring during a previous busy cycle immediately prior to the idle state comprises:

determining whether the previous busy cycle ended at a steady state level.

25. The non-transitory computer-readable storage medium of claim 24, wherein the stored processor-executable software instructions are configured to cause a processor to perform operations further comprising:

setting a CPU frequency for the next busy cycle to the steady state frequency in response to determining that the previous busy cycle ended at the steady state level.

26. The non-transitory computer-readable storage medium of claim 24, wherein the stored processor-executable software instructions are configured to cause a processor to perform operations further comprising:

determining whether the previous busy cycle ended at a maximum performance level in response to determining that the previous busy cycle did not end at the steady state level.

27. The non-transitory computer-readable storage medium of claim 26, wherein the stored processor-executable software instructions are configured to cause a processor to perform operations further comprising:

resetting a longest busy period in response to determining that the previous cycle ended at the steady state level.

28. The non-transitory computer-readable storage medium of claim 27, wherein the stored processor-executable software instructions are configured to cause a processor to perform operations further comprising:

determining a longest normalized busy period since the last reset.

* * * * *